US010881199B1

(12) United States Patent
Le et al.

(10) Patent No.: US 10,881,199 B1
(45) Date of Patent: Jan. 5, 2021

(54) COLLAPSIBLE TRAY STORAGE RACK

(71) Applicant: Cambro Manufacturing Company, Huntington Beach, CA (US)

(72) Inventors: Johannes Le, Huntington Beach, CA (US); Charles Jarvis, Irvine, CA (US)

(73) Assignee: Cambro Manufacturing Company, Huntington Beach, CA (US)

( * ) Notice: Subject to any disclaimer, the term of this patent is extended or adjusted under 35 U.S.C. 154(b) by 0 days.

(21) Appl. No.: 16/115,399

(22) Filed: Aug. 28, 2018

(51) Int. Cl.
*A47B 47/00* (2006.01)
*A47B 57/34* (2006.01)
*A47B 88/40* (2017.01)

(52) U.S. Cl.
CPC .......... *A47B 47/0075* (2013.01); *A47B 57/34* (2013.01); *A47B 88/402* (2017.01)

(58) Field of Classification Search
CPC .... A47B 47/0075; A47B 88/402; A47B 57/34
See application file for complete search history.

(56) References Cited

U.S. PATENT DOCUMENTS

| | | | | |
|---|---|---|---|---|
| 2,360,451 A | * | 10/1944 | Stone ..................... | A47B 43/02 312/265.5 |
| 2,547,463 A | * | 4/1951 | Haut ..................... | A47B 88/483 312/350 |
| 3,305,286 A | * | 2/1967 | Fenwick ................ | A47F 5/103 312/263 |
| 3,515,450 A | * | 6/1970 | Jaecke ................ | A47B 47/0075 312/245 |
| 3,722,971 A | * | 3/1973 | Zeischegg ............ | A47B 47/042 312/107 |
| 3,779,623 A | * | 12/1973 | Motohashi ......... | A47B 47/0075 312/257.1 |
| 4,120,551 A | * | 10/1978 | Godtschalck ........ | A47B 88/941 312/348.1 |
| 4,238,044 A | * | 12/1980 | Roddier ............. | B65D 11/1873 220/4.28 |
| 4,502,741 A | * | 3/1985 | DeVries ............... | A47B 47/042 108/102 |

(Continued)

FOREIGN PATENT DOCUMENTS

| | | | | |
|---|---|---|---|---|
| CH | 366646 A | * | 1/1963 | ............. A47B 88/43 |
| DE | 2207305 A1 | * | 8/1973 | ......... A47B 47/0075 |

(Continued)

*Primary Examiner* — Stanton L Krycinski
(74) *Attorney, Agent, or Firm* — Rutan & Tucker, LLP

(57) ABSTRACT

A rack features a front panel, a rear panel, a first rail assembly and a second rail assembly. The first rail assembly includes (i) support members extending in a first lateral direction, (ii) a first set of edge connectors extending in a first longitudinal direction for coupling with a first attachment mechanism of the front panel, and (iii) a second set of edge connectors extending in a second longitudinal direction for coupling with a third attachment mechanism of the rear panel. The second rail assembly includes (i) support members extending in a second lateral direction opposite the first lateral direction, (ii) a third set of edge connectors extending in the first longitudinal direction for coupling with the second attachment mechanism of the front panel, and (iii) a fourth set of edge connectors extending in the second longitudinal direction for coupling with the fourth attachment mechanism of the rear panel.

24 Claims, 13 Drawing Sheets

(56) References Cited

U.S. PATENT DOCUMENTS

| | | | | |
|---|---|---|---|---|
| 4,664,283 | A * | 5/1987 | Liu | A47B 47/042 206/509 |
| 4,782,972 | A * | 11/1988 | Wenkman | B42F 7/10 220/4.28 |
| 5,360,263 | A * | 11/1994 | Nakano | A47B 47/0075 312/257.1 |
| 5,372,415 | A * | 12/1994 | Tisbo | A47B 47/042 312/108 |
| 5,501,354 | A * | 3/1996 | Stromberg | B65D 1/225 220/7 |
| 5,588,541 | A * | 12/1996 | Goetz | A47B 87/008 211/186 |
| 5,934,486 | A | 8/1999 | Jarvis et al. | |
| 5,975,660 | A * | 11/1999 | Tisbo | A47B 47/045 312/108 |
| 6,113,203 | A * | 9/2000 | Chen | A47B 43/00 312/258 |
| 6,193,340 | B1 * | 2/2001 | Schenker | A47B 47/0075 312/108 |
| 6,409,037 | B1 * | 6/2002 | Lin | A47B 47/042 220/23.4 |
| 6,446,825 | B1 * | 9/2002 | Godoy | B65D 11/1833 220/1.5 |
| 6,557,709 | B2 * | 5/2003 | Broome | H05K 7/186 211/183 |
| D498,664 | S | 11/2004 | Gates | |
| 6,981,454 | B2 | 1/2006 | Burdick | |
| 6,991,115 | B2 * | 1/2006 | Chow | G11B 33/0483 211/188 |
| 7,159,730 | B2 * | 1/2007 | Rumpel | B65D 11/1833 220/23.6 |
| D630,935 | S | 1/2011 | Jarvis | |
| D648,159 | S | 11/2011 | Hense et al. | |
| D648,160 | S | 11/2011 | Le | |
| D648,582 | S | 11/2011 | Le | |
| D651,433 | S | 1/2012 | Le et al. | |
| 8,376,156 | B2 | 2/2013 | Jarvis et al. | |
| 8,376,157 | B2 | 2/2013 | Jarvis et al. | |
| 8,388,073 | B2 * | 3/2013 | Richter | A47B 47/025 312/108 |
| 8,627,966 | B2 | 1/2014 | Jarvis et al. | |
| D727,715 | S | 4/2015 | Munson | |
| D728,347 | S | 5/2015 | Munson | |
| D728,348 | S | 5/2015 | Munson | |
| 9,084,498 | B2 | 7/2015 | Maddux | |
| 9,161,620 | B2 | 10/2015 | Nicholson | |
| 9,801,476 | B2 | 10/2017 | Maddux et al. | |
| 2002/0063100 | A1 * | 5/2002 | Kwang | G11B 33/0483 211/40 |
| 2004/0178704 | A1 * | 9/2004 | Saravis | A47B 47/0033 312/111 |
| 2007/0051721 | A1 * | 3/2007 | Wu | B65D 11/1873 220/23.6 |
| 2007/0158280 | A1 * | 7/2007 | Cox | H05K 7/1488 211/26 |
| 2010/0326941 | A1 * | 12/2010 | Rosenblum | A47B 43/00 211/188 |
| 2015/0144578 | A1 * | 5/2015 | Maiden | A47B 7/025 211/26 |

FOREIGN PATENT DOCUMENTS

| | | | | |
|---|---|---|---|---|
| FR | 2194248 | A6 * | 2/1974 | A47B 47/0075 |
| FR | 2248669 | A5 * | 5/1975 | A47B 53/00 |
| FR | 2665062 | A1 * | 1/1992 | A47B 67/04 |
| GB | 1398137 | A * | 6/1975 | A47B 17/033 |

* cited by examiner

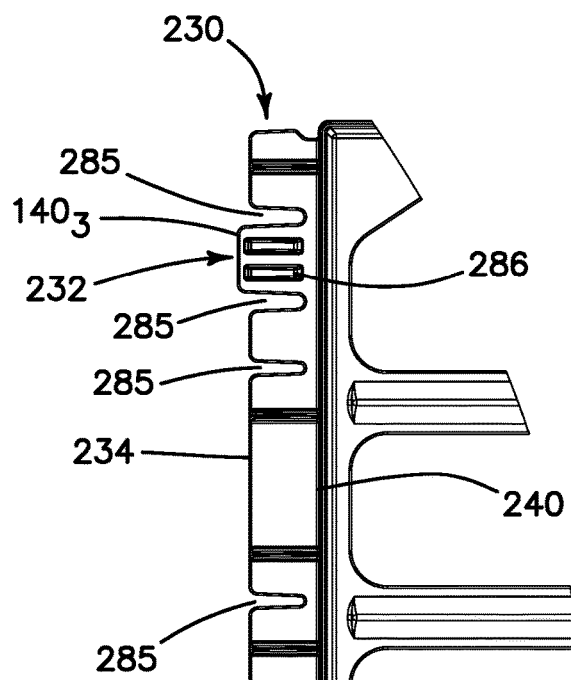
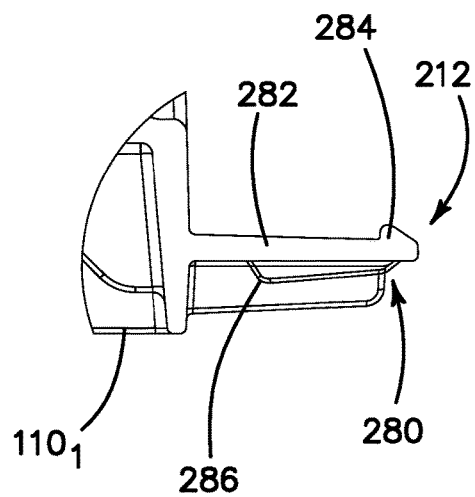
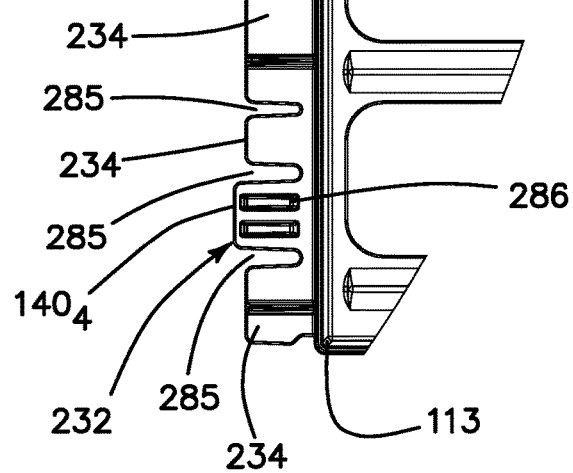
FIG. 2D
FIG. 2E

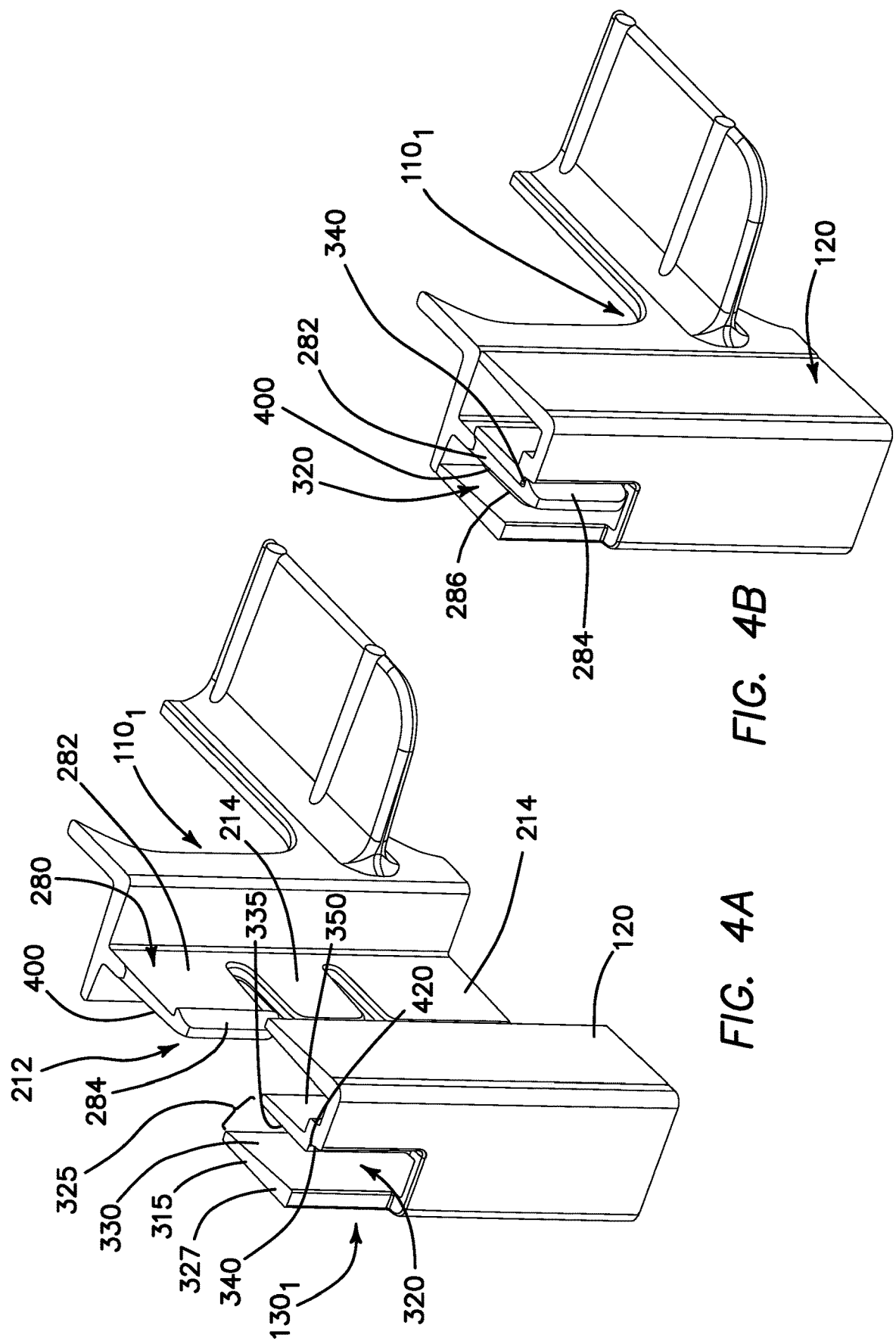

COLLAPSIBLE TRAY STORAGE RACK

FIELD

Embodiments of the disclosure relate to a modular storage rack. More specifically, one embodiment of the disclosure relates to a tray storage rack featuring rail assemblies, a front panel and a rear panel that are removably coupled together and may be disassembled for shipment or transit.

GENERAL BACKGROUND

In many establishments, such as restaurants, bakeries and grocery stores for example, food items may be cooked in advance of customer orders. Examples of such food items include baked goods (e.g., breads, muffins, cookies, pies, etc.), which are baked on trays. After the food items are baked, the trays are removed from an oven and placed onto a food tray cart for cooling. During cooling, the baked goods remain temporarily on the trays until packaging and/or placement into display areas for sale.

For decades, conventional food tray carts were manufactured with permanent, metal shelving upon which the trays rest. Recently, however, food tray storage devices have been developed based on tray storage units fabricated from injection molded plastic, where each of these tray storage units are stackable and vertically aligned by their attachment to channels etched into vertical posts. Such food tray storage devices are described in U.S. patent application Ser. No. 15/799,875 filed Oct. 31, 2017 entitled "Tray Storage Device," the contents of which are incorporated by reference herein.

Given the above-described architectures, neither the metal food tray cart nor the above-described food tray storage devices are configured for placement on a shelf of a stand-alone rack. Moreover, neither the metal food tray cart nor the above-described food tray storage devices may be easily disassembled, especially from a box-shaped structure into components suitable for shipping in order to reduce shipping and transport costs.

BRIEF DESCRIPTION OF THE DRAWINGS

Embodiments of the invention are illustrated by way of example and not by way of limitation in the figures of the accompanying drawings, in which like references indicate similar elements and in which:

FIG. 2D is a plan view of a locking edge connector of a first set of edge connectors used in coupling the rail assembly to a front panel as shown in FIG. 1 and FIG. 2C.

FIG. 2E is a perspective view of a first embodiment of a set of edge connectors extending from a side member of the rail assembly of FIG. 2A.

FIG. 4A is a perspective view of a coupling between the locking edge connector of a rail assembly and a snap lock of a front or rear panel.

FIG. 4B is a perspective view of the locking edge connector of a rail assembly inserted into and retained by the front or rear panel.

DETAILED DESCRIPTION

Figure 1:
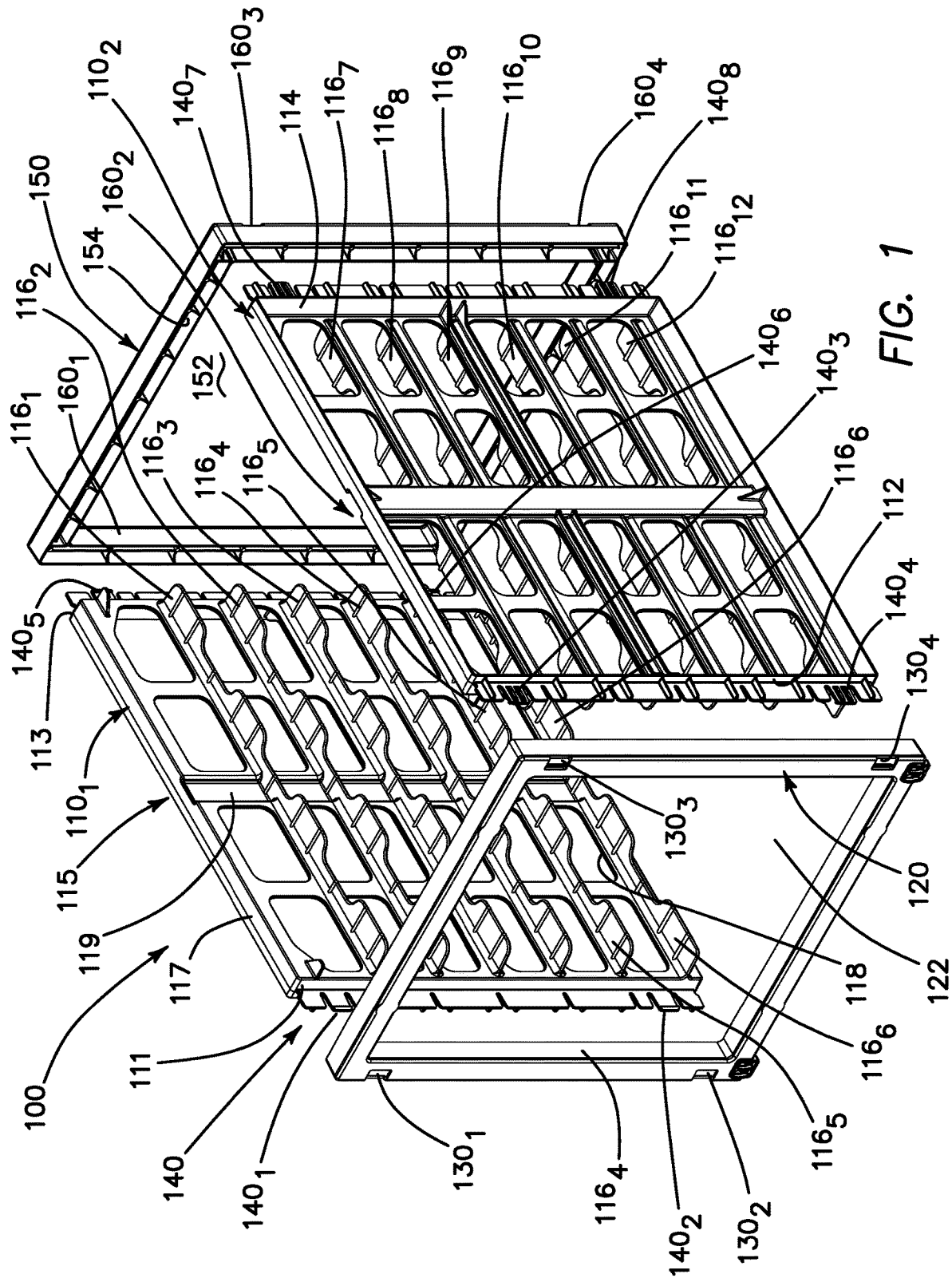
FIG. 1 is an exploded view of an exemplary embodiment of a modular, tray storage rack.

Embodiments of the present disclosure generally relate to collapsible, tray storage rack including a pair of removable and interchangeable rail assemblies, which are configured and positioned to support one or more trays. The tray storage rack further includes a front panel and a rear panel to which the rail assemblies are attached to form a modular, collapsible tray storage rack, as described below.

I. OVERVIEW

According to one embodiment of the disclosure, a collapsible tray storage rack features a pair of rail assemblies, which are removably coupled to both a front panel and a rear panel to form a box-shaped, collapsible tray storage rack. Herein, according to one embodiment of the disclosure, one or more tray storage racks may be placed on a shelf of a shelving unit and each tray storage rack may include one or more securing components, which are used to mitigate lateral (sideway) and/or longitudinal (forward/backward) movement of the tray storage racks after placement on the shelf of a shelving unit. These securing components may include one or more fasteners (e.g., rack-to-rack bracket and/or shelving-to-rack clip) and/or one or more lugs.

According to this embodiment of the disclosure, each rail assembly is fabricated from injection molded plastic as a singular component, although it is contemplated that a rail assembly may be formed by coupling multiple injection molded components together. When installed as part of the tray storage rack, each rail assembly features a frame and a plurality of support members. The frame includes an upper member, a lower member, a pair of side members coupled to both the upper and lower members, and/or one or more reinforcement members. Each of the plurality of support members extends longitudinally between the pair of side members and extends laterally from the frame. Also, each of the plurality of support members of a first rail assembly is laterally aligned with a complementary support member from a different (second) rail assembly in order to collectively receive and support a tray in an elevated state from a bottom surface of the lower members of the first rail assembly and the second rail assembly.

Additionally, for the first rail assembly, a first plurality of edge connectors extend from the first side member and a second plurality of edge connectors extend from the second side member of the frame. The first plurality of edge connectors include one or more locking edge connectors, each locking edge connector is configured for insertion into and coupling to an attachment mechanism formed as part of the front panel (referred to as a "snap lock"). The first plurality of edge connectors further include two or more retention edge connectors that are sized (width) to be securely positioned within a channel produced between a first rail corresponding to an edge surface of a side panel member of the front panel and a second rail formed in parallel with the first rail. The channel may be accessible from a back side of the front panel and interrupted by cross members to maintain and support rail alignment. Similarly, the second plurality of edge connectors include one or more locking edge connectors, each being configured for insertion into and coupling to a snap lock formed as part of the rear panel, along with two or more retention edge connectors. As described above, each retention edge connector is sized to fit securely within a channel accessible from a back side of the rear panel, which is produced between a rail forming an edge surface of a side panel member of the rear panel and another rail formed in parallel therewith.

The tray storage rack features additional components that improve operability of the rack when positioned on a shelving unit. For example, one or more lugs may be formed as part of the front panel and/or rear panel. Each of the lugs formed as part of the front panel partially extends below a bottom edge of a lower (horizontal) member of the front panel for placement in front of (and adjacent to) a forward-facing edge of a shelf of the shelving unit. This prevents unintended backward movement of the tray storage rack when placed on the shelf. Additionally, or in the alternative, one or more lugs may be similarly formed as part of the rear panel and positioned, in relation to a backward-facing edge of the shelf, to prevent unintended forward movement of the tray storage rack when placed on the shelf.

Another additional component utilized by the tray storage rack may include a first fastener that is configured for coupling rail assemblies of neighboring tray storage racks, especially with the tray storage rack and its neighboring tray storage rack are placed on the same shelf of a shelving unit. More specifically, as described above, each rail assembly is formed by a frame, where each upper frame member includes a notch. The first fastener is formed as a bracket including a horizontal base plate and two angled, attachment arms extending from the plate. The attachment arms are sized for at least partial placement within the notch prefabricated in the upper frame member of a rail assembly of the tray storage rack and the notch prefabricated in the upper frame member of the rail assembly of the neighboring tray storage rack.

Yet another additional component utilized by the tray storage rack may include a second fastener that is configured as a clip for attachment of the tray storage rack to a post of the shelving unit. More specifically, a first end of the second fastener is positioned within an aperture of the snap lock and retained therein while a second end of the second fastener is configured to at least partially wrap around and attach to the post of the shelving unit to further improve retention of the tray storage rack on the shelf of the shelving unit.

References in the specification to "one embodiment" or "an embodiment," may indicate that the embodiment described may include a particular feature, structure, or characteristic, but every embodiment may not necessarily include that particular feature, structure, or characteristic. Moreover, such phrases are not necessarily referring to the same embodiment. Further, when a particular feature, structure, or characteristic is described in connection with an embodiment, it is submitted that such feature, structure, or characteristic may be deployed in connection with other embodiments whether or not explicitly described Herein, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Any feature or combination of features described herein are included within the scope of the invention provided that the features included in any such combination are not mutually inconsistent as will be apparent from the context, this specification, and the knowledge of one of ordinary skill in the art. Additional advantages and aspects of the present invention are apparent in the following detailed description and claims. Stated differently, this invention is susceptible to embodiments of many different forms, and thus, it is intended that the disclosure be considered as an example of the principles of the invention and not intended to limit the invention to the specific embodiments shown and described.

II. GENERAL ARCHITECTURE

Referring to FIG. 1, an illustrative embodiment of a collapsible, tray storage rack 100 is shown. The tray storage rack 100 comprises a first rail assembly $110_1$, a second rail assembly $110_2$, a front panel 120 and a rear panel 150. The front panel 120 includes a plurality of attachment mechanisms $130_1$-$130_L$ (L≥2; L=4 as shown in FIG. 1), hereinafter referred to as "snap locks." According to one embodiment of the disclosure, at least one snap lock is prefabricated in each side panel member of the front panel 120. For example, when two snap-locks (e.g., snap locks $130_1$ and $130_3$) are prefabricated in the front panel 120, these snap locks may be positioned toward a middle area of the side panel members. According to another embodiment, as shown, snap locks $130_1$-$130_4$ may be positioned proximate to corner areas of the front panel 120 (e.g., within three inches from any corner).

As generally shown in FIG. 1, snap locks $130_1$-$130_2$ may be configured to receive and retain the locking edge connectors $140_1$-$140_2$ for coupling the front panel 120 to the first rail assembly $110_1$. The locking edge connectors $140_1$-$140_2$ protrude from a forward-facing edge of a first side member 111 of the first rail assembly $110_1$. Similarly, snap locks $130_3$-$130_4$ are configured to receive and retain locking edge connectors $140_3$-$140_4$ from the second rail assembly $110_2$. The locking edge connectors $140_3$-$140_4$ protrude from a forward-facing edge of a first side member 112 of the second rail assembly $110_2$. As described below in greater detail, each locking edge connector $140_1$, . . . , or $140_4$ is configured to be inserted into an aperture of a corresponding snap lock $130_1, \ldots,$ or $130_4$ and a portion of each locking connector $140_1$-$140_4$ is received by and retained within a corresponding recess within the snap locks $130_1$-$130_4$, as illustrated in FIGS. 4A-4B.

The rear panel 150 has a similar architecture as the front panel 120. The rear panel 150 includes a plurality of snap locks $160_1$-$160_M$ (M≥2; M=4 as shown in FIG. 1), which may be prefabricated in the rear panel 150 in a manner similar to the snap locks $130_1$-$130_L$ of the front panel 120. The number (L) of snap locks $130_1$-$130_L$ formed in the front panel 120 may be the same or differ from the number (M) of snap locks $160_1$-$160_M$ formed in the rear panel 150. Herein, snap locks $160_1$-$160_2$ may be configured to receive the locking edge connectors $140_5$-$140_6$, which are vertically oriented and protrude from a backward-facing edge of a second side member 113 of the first rail assembly $110_1$. Similarly, snap locks $160_3$-$160_4$ may be configured to receive locking edge connectors $140_7$-$140_8$, which are vertically oriented and protrude from a backward-facing edge of the second side member 114 of the second rail assembly $110_2$. The second side members 113 and 114 are opposite to the first side members 111 and 112, respectively.

Herein, according to one embodiment of the disclosure, each rail assembly (e.g., rail assembly $110_1$) includes a frame 115 and a plurality of support members $116_1$-$116_N$ (N≥2; N=6) extending longitudinally between side members 111 and 113 of the frame 115 and extending laterally from the frame 115. The frame 115 includes an upper member 117, a lower member 118, the side members 111 and 113, and/or one or more reinforcement members 119. Herein, for clarity, the architecture of the first rail assembly $110_1$ is described, although the same architecture may be used for the second rail assembly $110_2$ being part of the tray storage rack 100.

As shown in FIG. 1, each of the plurality of support members $116_1$-$116_6$ of the first rail assembly $110_1$ is laterally aligned with and generally co-planar with a complementary support member (e.g., $116_{N+1}$-$116_{2N}$; N≥2; N=6) from a different (second) rail assembly $110_2$ in order to collectively receive and support a tray in an elevated state from a bottom surface of the lower members of the rail assemblies $110_1$ and $110_2$. The support members $116_1$-$116_6$ are oriented at corresponding heights to collectively retain food trays that are inserted through an opening 122 of the front panel 120. The reinforcement member(s) 119 may be positioned on an outer side of the support members $116_1$-$116_6$ so as to avoid interference with trays being slid onto a support member of the first rail assembly $110_1$ and its complementary support member of the second rail assembly $110_2$.

Upon connecting the rail assemblies $110_1$ and $110_2$ to the front panel 120 and the rear panel 150, the rectangular-shaped tray storage rack 100 is formed. The front panel 120 includes the opening 122 sized to permit food trays to pass therethrough for placement onto or retrieval from a selected support member pair (e.g., $116_1$ and $116_7$). The rear panel 150 may be configured with an opening 152 also sized to allow for insertion or retrieval of one or more food trays therefrom. In contrast, the opening 152 of the rear panel 150 may be smaller than the opening 122 of the front panel 120 thereby allowing for the insertion of food trays via the front panel 120 while providing for airflow through the tray storage rack 100.

Figure 2A:
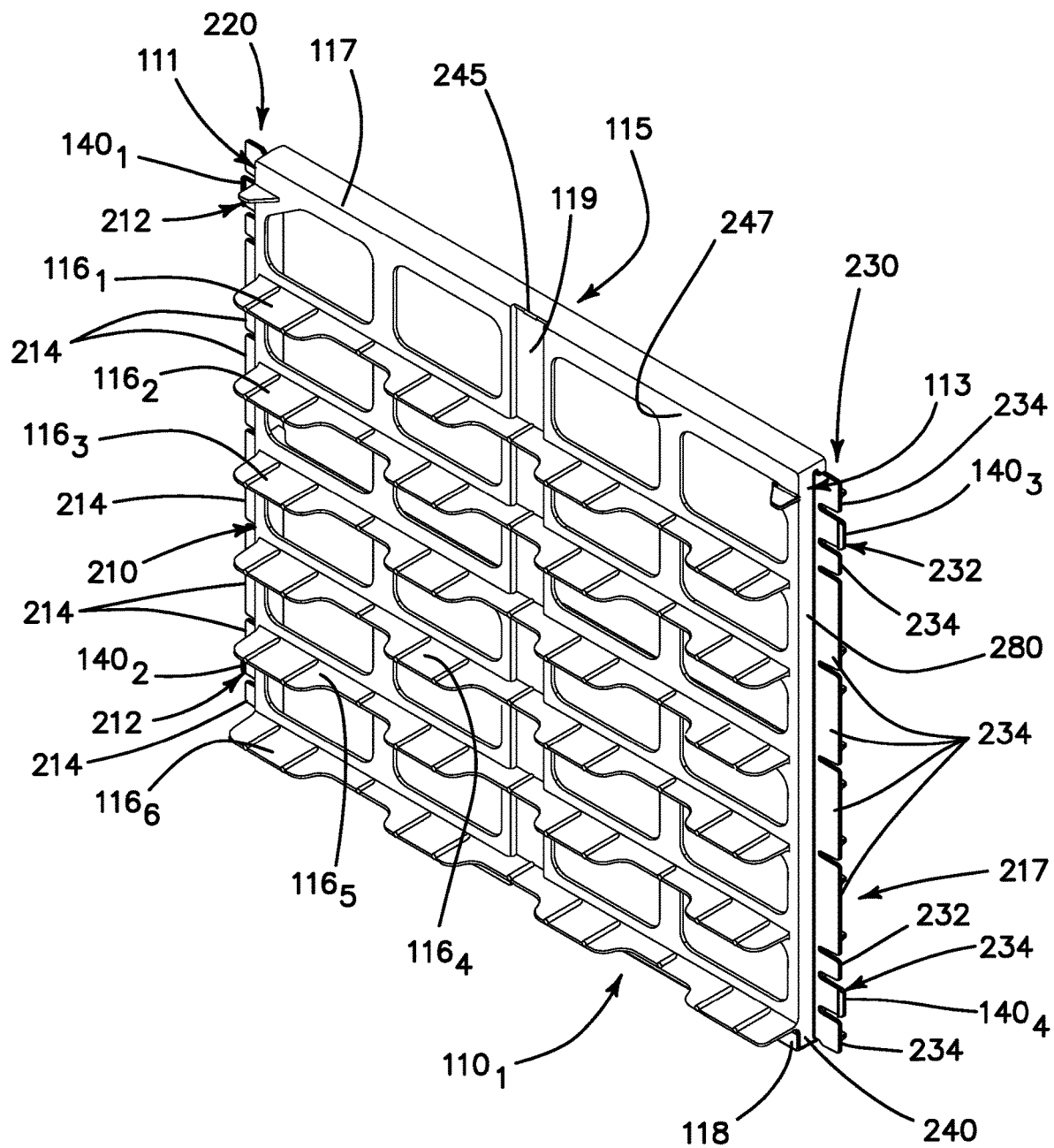
FIG. 2A is an elevated, perspective view of a front side of a rail assembly of the tray storage rack of FIG. 1.

Referring now to FIG. 2A, a first illustrative embodiment of an elevated, perspective view of a front side of the first rail assembly $110_1$ of the tray storage rack 100 of FIG. 1 is shown. The first rail assembly $110_1$ includes the frame 115 formed by the upper member 117, the lower member 118, the side members 111 and 113 coupled to the upper and lower members 117 and 118, and/or the one or more reinforcement members 119. The support members $116_1$-$116_N$ (e.g., N=6 for this embodiment) are oriented to extend longitudinally between the side members 111 and 113 and laterally from the frame 115. Each support member $116_1$-$116_6$ is sized to partially maintain a tray in an elevated state when inserted into the tray storage rack 100. As illustrated, each support member $116_1$-$116_6$ may be separated from each other by at least a prescribed distance, such as one and one-half inches or approximately three inches for example. In order to maintain the same overall height as the first rail assembly $110_1$, the number of support members $116_1$-$116_N$ may increase or decrease depending on the distance of separation between neighboring support members. The number of support members has an inverse relationship to the distance of separation, where the number of support members may decrease as the distance of separation increases.

Herein, the first rail assembly $110_1$ includes a first set of edge connectors 210 protruding from a forward-facing edge 220 of the first side member 111 and a second set of edge connectors 230 protruding from a backward-facing edge 240 of the second side member 113. Of the first set of edge connectors 210, one or more of the edge connectors 212 operate as locking edge connectors, which are illustrated as connectors $140_1$ and $140_2$ in FIG. 1. Each locking edge connector 212 is configured for insertion into and coupling to an attachment mechanism (e.g., snap locks $130_1$-$130_2$ of FIG. 1). The other remaining edge connectors 214 include two or more retention edge connectors that are sized (e.g., having a width) to be securely positioned within a channel 242 formed on a backside 124 of the front panel 120 as shown in FIG. 3D.

Similarly, the second set of edge connectors 230 include one or more edge connectors 232 operating as locking edge connectors, which are illustrated as connectors $140_3$ and $140_4$ in FIG. 1. Each locking edge connector 232 is configured for insertion into and coupling to a snap lock (e.g., snap lock $130_3$-$130_4$ of FIG. 1). The other remaining edge connectors 234 include two or more retention edge connectors that are sized (e.g., having a width) to be securely positioned within a channel 244 formed on a backside 154 of the rear panel 150, as shown in FIG. 1.

Additionally, a notch 245 is formed in the upper member 117 of the first rail assembly $110_1$. More specifically, the notch 245 is positioned along an inner edge 247 of the upper member 117 to allow for the attachment of a securing mechanism, such as a fastener for example, to prevent movement of multiple tray storage racks positioned on a shelf surface as illustrated in FIG. 5A.

Referring back to FIG. 1, the plurality of support members $116_1$-$116_6$ of the first rail assembly $110_1$, operating in concert with support members $116_7$-$116_{12}$ of the second rail assembly $110_2$, are configured to support rectangular trays. However, it is contemplated that the support members $116_1$-$116_{12}$ of the rail assemblies $110_1$ and $110_2$ may be configured to support other types of polygon-shaped trays besides rectangular tray (e.g., trapezoidal, square, etc.), circular-shaped trays, or even oval shaped trays. In some circumstances, the shape and size of the support members $116_1$-$116_{12}$ of the rail assemblies $110_1$ and $110_2$ may need to be modified to support certain tray shapes and dimensions. However, such modifications do not depart from the broader spirit and scope of the invention directed to the modular nature and general construction of the rail assemblies as well as their interconnectivity with other components of the tray storage rack 100 as described below.

Figure 2B:
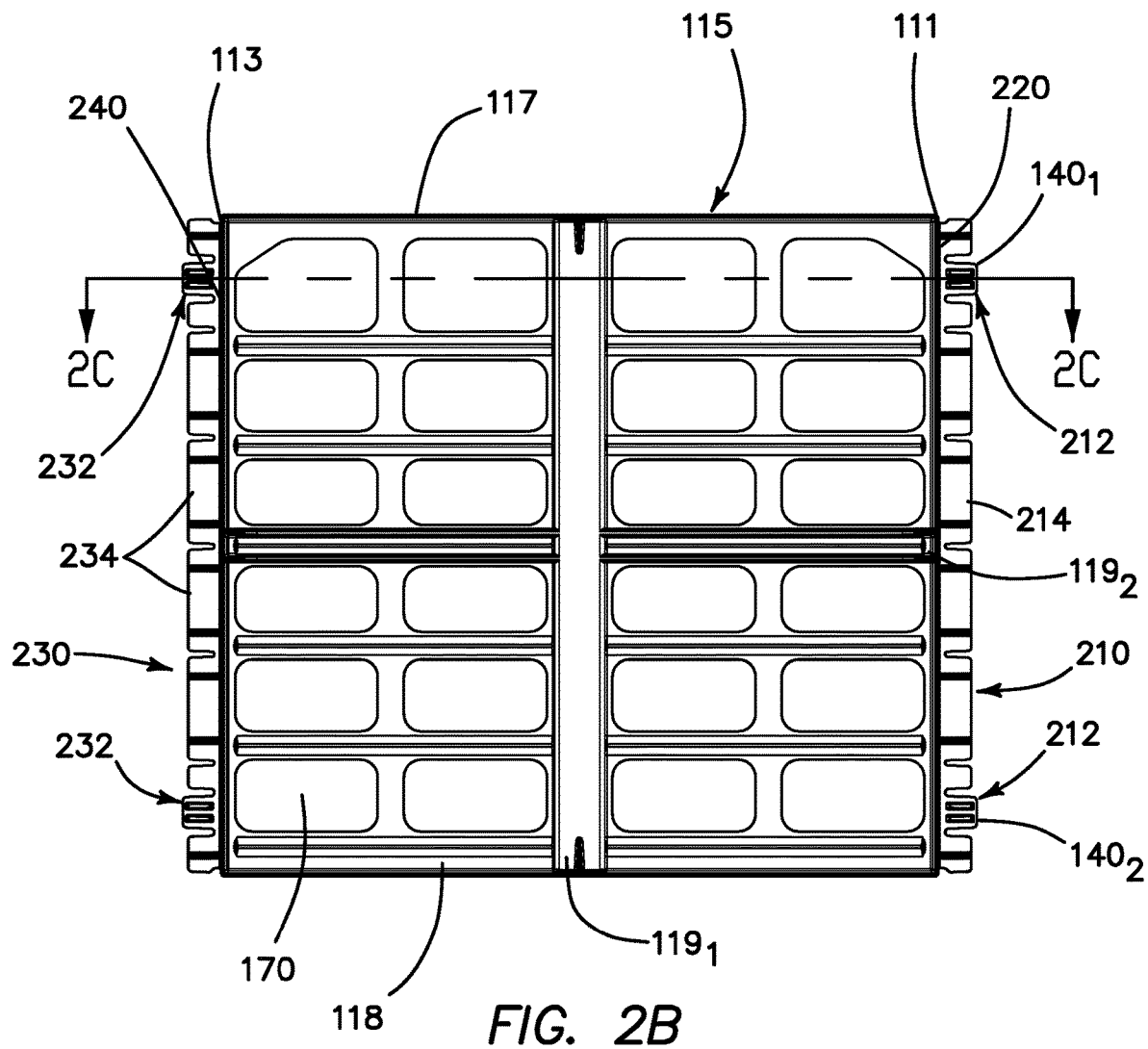
FIG. 2B is a side perspective view of a back side of the rail assembly of the tray storage rack of FIG. 2A.

Referring to FIG. 2B, a side perspective view of a back side of the first rail assembly $110_1$ of the tray storage rack 100 is shown. Herein, the first set of edge connectors 210 are positioned to protrude from the forward-facing edge 220 of the first side member 111. Of the first set of edge connectors 210, the locking edge connectors 212 are configured to protrude from the forward-facing edge 220 by a greater distance than the retention edge connectors 214. The reason for the sizing difference is that, according to this embodiment, the locking edge connectors 212 need to penetrate into a backside 124 of the front panel 120 a greater distance than placement of the retention edge connectors 212 within the channel 242 formed in the backside 124 of the front panel 120. Similarly, the second set of edge connectors 230 are positioned to protrude from the rear-facing edge 240 of the second side member 113, where the locking edge connectors 232 protrude from the rear-facing edge 240 by a greater distance than the retention edge connectors 234.

For this embodiment of the disclosure, one or more reinforcement members 119 may be coupled to portions of the frame 115 to assist in countering additional forces being applied to the frame 115. More specifically, according to one embodiment of the disclosure, a first reinforcement member $119_1$ may be positioned between the upper member 117 and the lower member 118 and another reinforcement member $119_2$ may be positioned between the first side member 111 and the second side member 113 of the first rail assembly $110_1$. The reinforcement member $119_2$ is structured as part of the frame 115 to assist in countering additional downward forces being applied to the support members $116_1$-$116_6$ when a tray is placed with the tray storage rack 100.

To provide lateral airflow, side vent areas 170 are formed as openings between neighboring support members (e.g., $116_1$-$116_2$, $116_2$-$116_3$, etc.). More specifically, extending laterally from the frame 115, the support members $116_1$-$116_N$ are physically separated and side vent areas 170 are formed in between the support members $116_1$-$116_N$ to provide for lateral movement of air to cool the trays and items that are placed on the trays. As shown, the front-facing edge 220 includes the locking edge connectors 212, specifically a first locking edge connector $140_1$ arranged for insertion into a corresponding upper snap lock $130_1$ and a second locking edge connector $140_2$ arranged for insertion into a corresponding lower snap lock $130_2$ (see FIG. 1). A cross-sectional, top, plan view of the first rail assembly $110_1$, which is taken along lines 2C-2C, is shown in FIG. 2C.

Figure 2C:
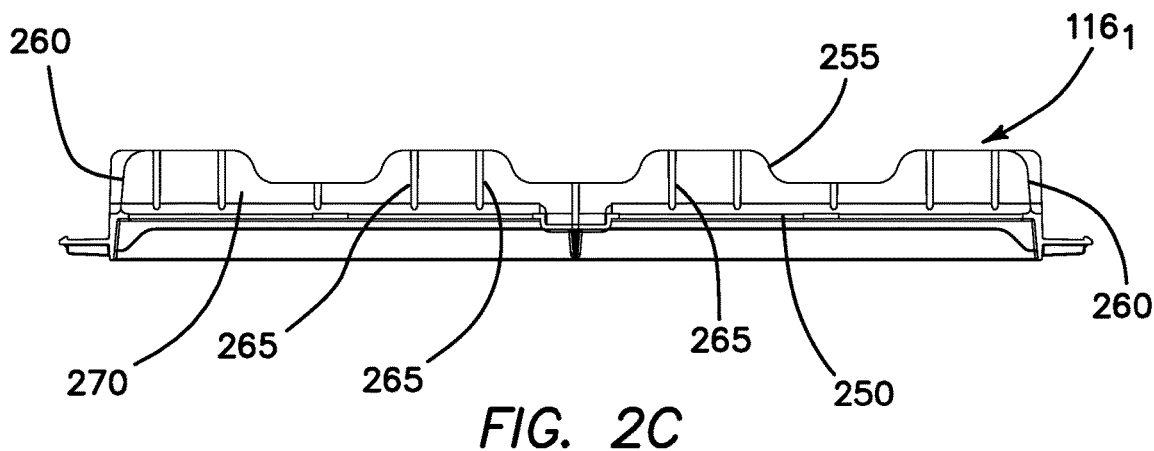
FIG. 2C is a top, plan view of the rail assembly of the tray storage rack taken along lines 2C-2C of FIG. 2B.

Referring now to FIG. 2C, according to one embodiment of the disclosure, a top plan view of the of the first rail assembly $110_1$, including the support member $116_1$, is shown. Herein, the support member $116_1$ includes a first raised edge 250 and a substantially planar, shelf member 255 laterally extending from the first raised edge 250 toward an interior area of the tray storage rack 100. Herein, the first raised edge 250 is positioned along a substantial length of the shelf member 255 in order to impede lateral movement of a tray when positioned on the shelf member 255 and its complementary support member (e.g., support member $116_7$) of the second rail assembly $110_2$. Additionally, the support member $116_1$ may include one or more second raised edges 260 to restrict longitudinal movement of a tray when inserted into the tray storage rack 100 and resting on a support member pair (e.g. support members $116_1$, $116_7$ of the first rail assembly $110_1$ and the second rail assembly $110_2$ per FIG. 1).

Using the support member $116_1$ as an illustrative example of the construction for all of the support members $116_1$-$116_{2N}$, the shelf member 255 includes a plurality of ribs 265 positioned on a top surface 270 of the substantially planar, shelf members 255. According to this embodiment of the disclosure, the ribs 265 are positioned to maintain the tray, especially a tray out of the oven, from directly contacting the planar, top surface 270 of the shelf member 255 and potentially damaging, from the excessive heat, its structural integrity. Each of the plurality of ribs 265 may compose the same material as the shelf member 255 or, where multi-material injection molding is available, may be composed of a material having better heat reflective properties than the plastic material (e.g., polypropylene) used in the formation of the support member $116_1$ (and first rail assembly $110_1$). Examples of materials with better heat reflective properties include, but are not limited or restricted to a fluoropolymer, silicone polymer, or the like. As another embodiment of the disclosure, instead of being formed with a material having better heat reflective properties than the plastic material, each of the plurality of ribs 265 may be coated with such material. This coating may be applied during or after manufacturing of the rail assembly $110_1$.

As shown in FIG. 2D, a downward, plan view of an embodiment of the locking edge connector 212 is shown. Herein, the locking edge connector 212 may be represented by a first protrusion 280, which includes an elongated tab 282 and a tapered end portion 284. The tapered end portion 284 is received by a recess formed as part of the first snap lock $130_1$ to securely fasten the rail assembly $110_1$ to the front panel 120, as illustrated in detail in FIGS. 4A-4B and described below. As an alternative embodiment, a spacer 286 may be formed on a side of the elongated tab 282 and extends laterally therefrom. For this embodiment, the first protrusion 280, including the spacer 286, are inserted into an aperture of the first snap lock $130_1$. For this embodiment, the tapered end portion 284 is biased to reside within the recess, and the spacer 286 occupies area proximate to an aperture formed in the first snap lock $130_1$ so that the locking edge connector 212 snugly fits within the aperture. As a result, a lateral force needs to be applied to the tapered end portion 284 to allow for its removal from the recess, and thereafter, longitudinal forces to be applied to the first rail assembly $110_1$ to remove the locking edge connector 212 from the first snap lock $130_1$.

Figure 2F:
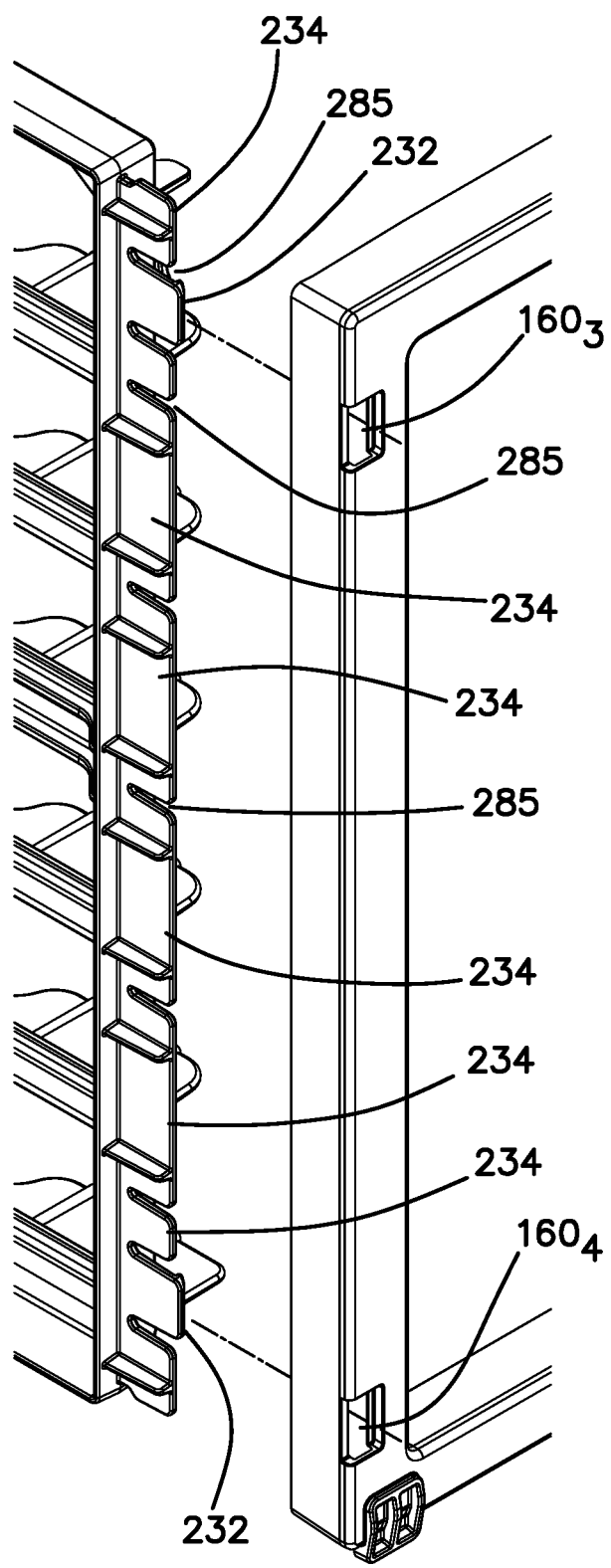
FIG. 2F is a perspective view of a second embodiment of a set of the edge connectors extending from a side member of the rail assembly of FIG. 2A.

Referring now to FIGS. 2E-2F, detailed illustrations of the second set of edge connectors 230 for coupling the first rail assembly $110_1$ to the rear panel, which features an architecture identical to the front panel, is shown. As described above, the edge connectors 230 extend from the rear-facing edge 240 of the side member 113. Of the second set of edge connectors 230, as shown, a pair of locking edge connectors 232 are configured for insertion into and coupling to a corresponding snap lock formed as part of the rear panel 150. Specifically, a third locking edge connector $140_3$ is arranged for insertion into a corresponding upper snap lock $130_3$ and a fourth locking edge connector $140_4$ is arranged for insertion into a corresponding lower snap lock $130_4$ (see FIG. 1).

As shown, the second set of edge connectors 230 is implemented with an architecture different than the edge connector architecture illustrated in FIG. 2B. Although not shown, the first set of edge connectors 210 may be deployed with a similar architecture. Herein, each of the locking edge connectors 232 includes one or more spacers 286 to assist in securing the locking edge connectors 232 to the rear panel. Besides the locking edge connectors 232, two or more retention edge connectors 234 are sized with a width to be positioned within and mechanically secured, by pressure, to a channel formed on a backside of a side panel member of the rear panel. A spacing 285 is provided between neighboring edge connectors 230 to account for cross members positioned to intersect the channel to support rigidity of the rails forming a side panel member of the rear panel 150.

Referring now to FIG. 2F, a second embodiment of the second set of edge connectors 230 for coupling the first rail assembly $110_1$ to the rear panel 150 is shown. Herein, each retention edge connector 234 of the second set of edge connectors 230 includes one or more spacers 286 sized with a width to be positioned within and mechanically secured, by pressure, to a channel formed on a backside of a side panel member of the rear panel 150. As described above, the spacing 285 is provided between neighboring edge connectors 230 to account for cross members that may be positioned to intersect the channel to support rigidity of the members forming the rear panel.

Figure 3A:
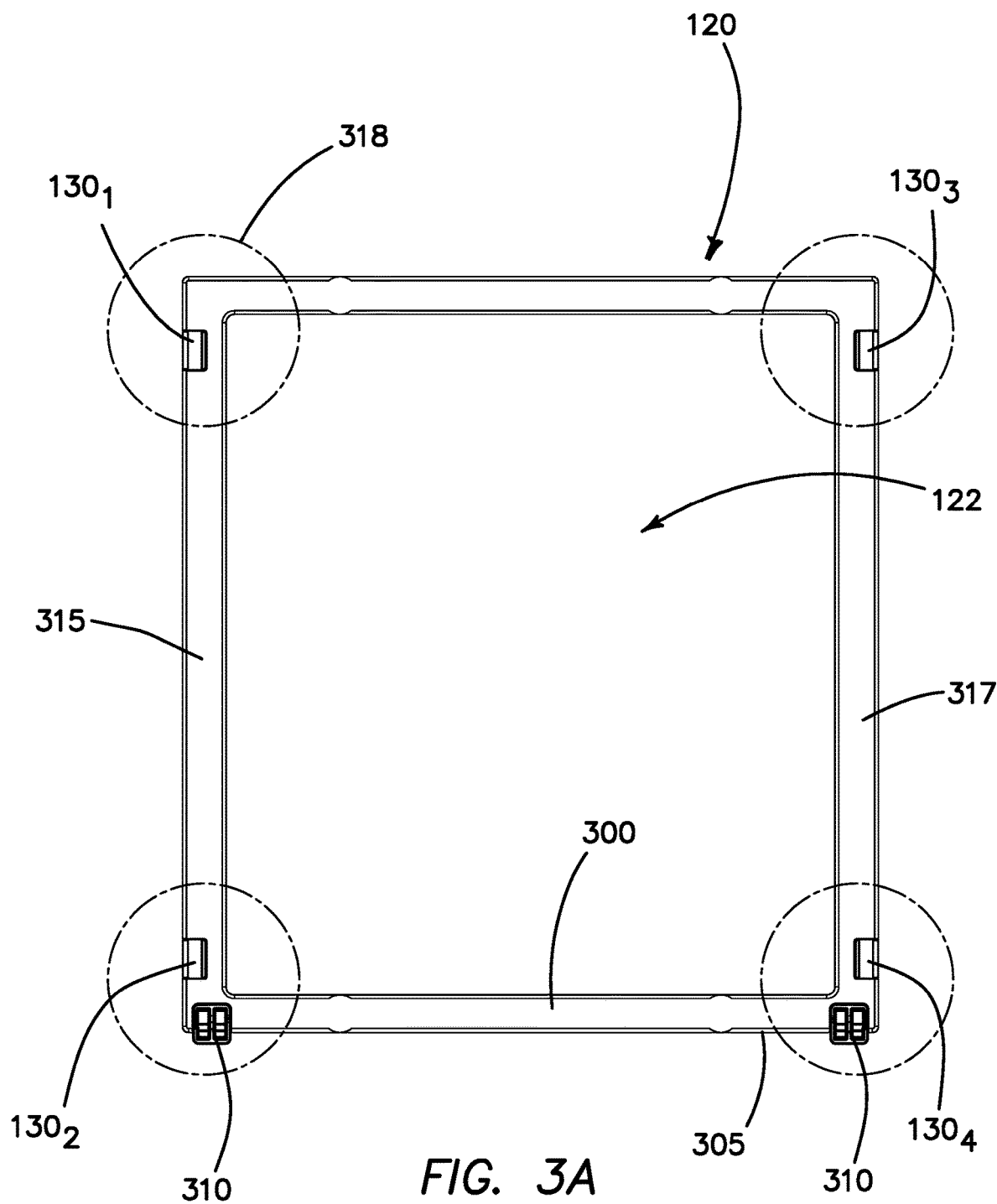
FIG. 3A is a front perspective view of the front panel of the tray storage rack of FIG. 1.
Figure 6A:
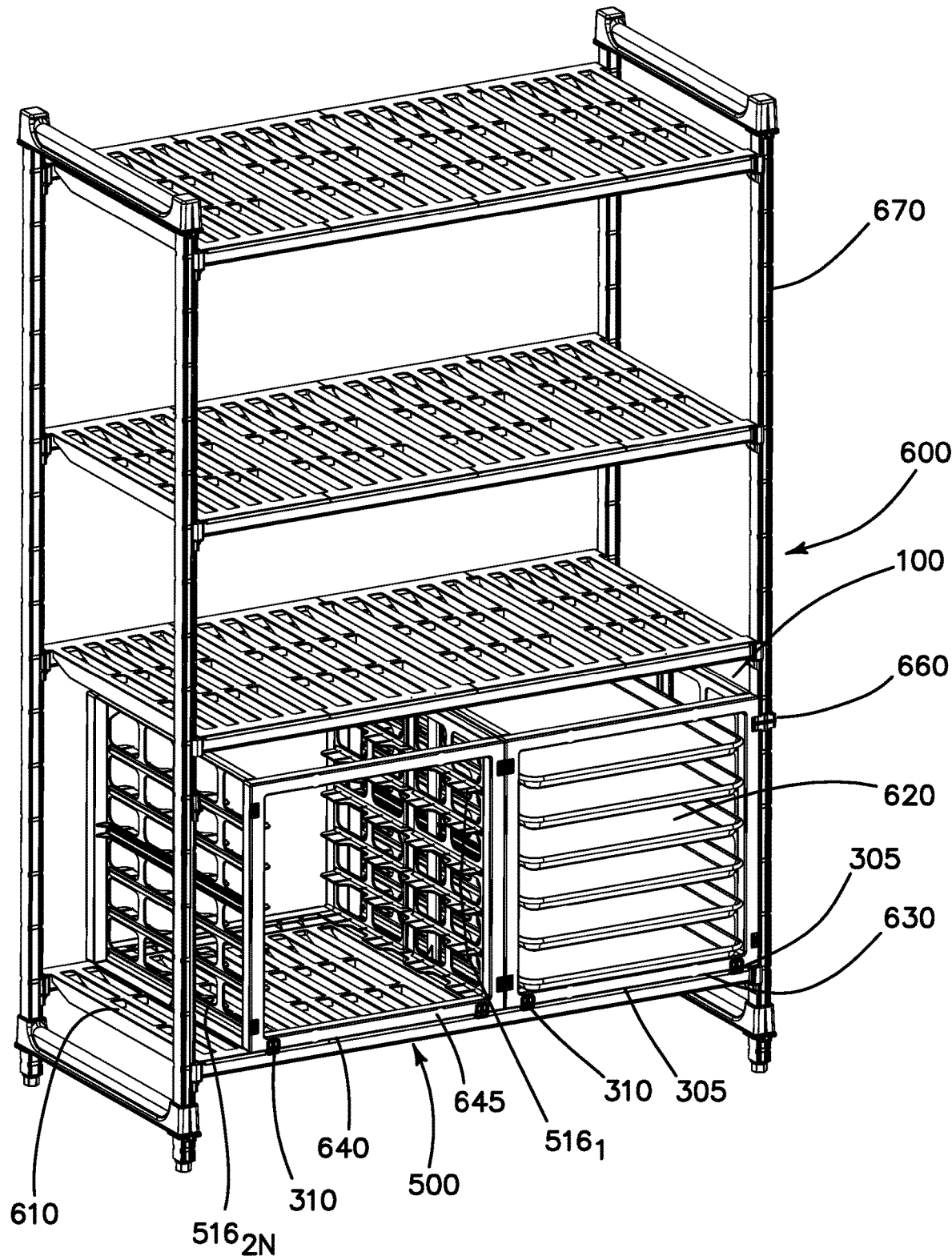
FIG. 6A is a front view of an illustrative embodiment of the first collapsible tray storage rack and the second collapsible tray storage rack being maintained on a shelf of a shelving unit.
Figure 6B:
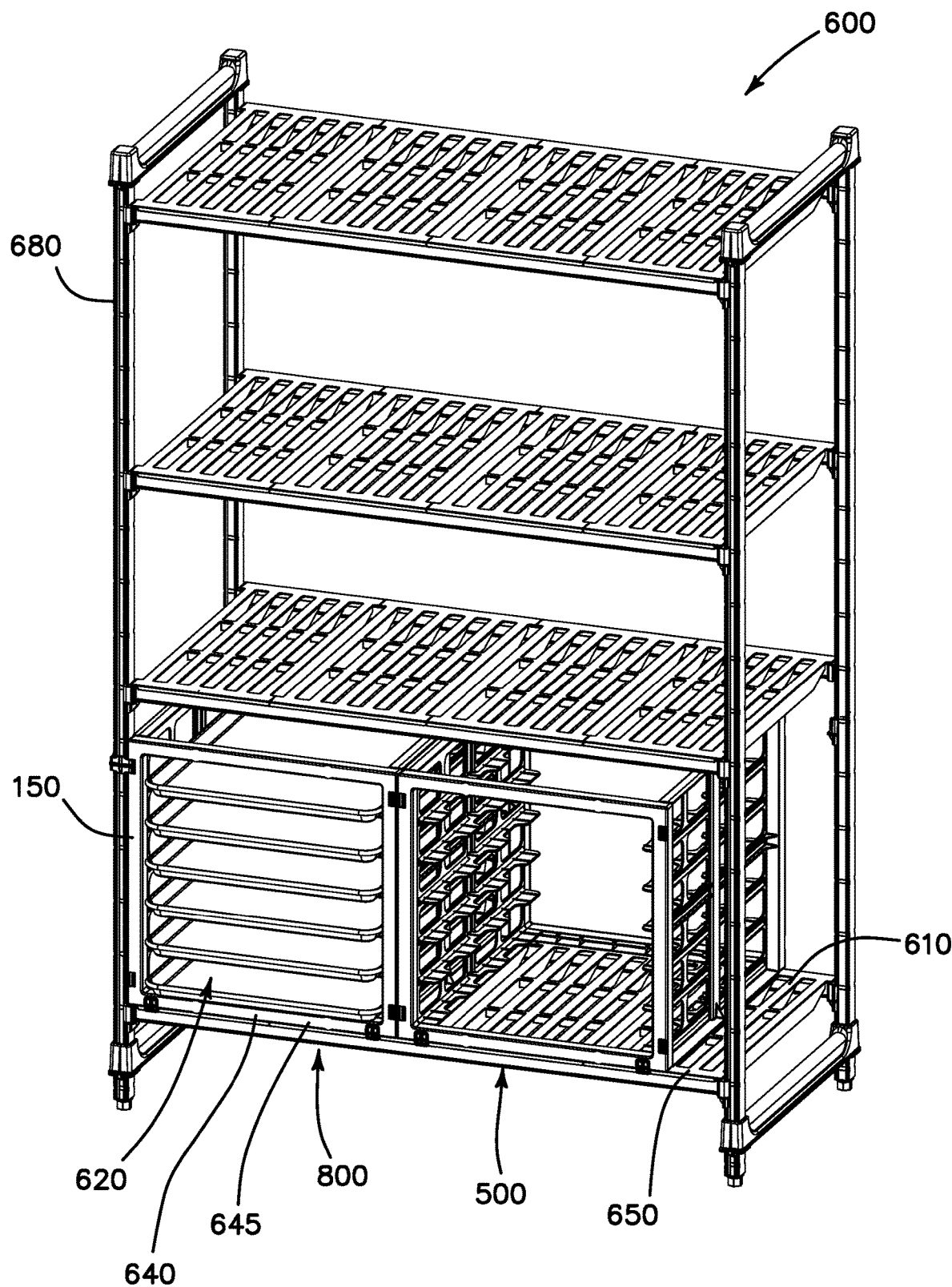
FIG. 6B is a rear view of an illustrative embodiment of the first collapsible tray storage rack and the second collapsible tray storage rack being maintained on the shelf of a shelving unit.

Referring now to FIG. 3A, a first illustrative embodiment of the front panel 120 is shown, although it is contemplated that the rear panel 150 may be configured in accordance with the same architecture as the front panel 120. Herein, the front panel 120 includes a plurality of snap locks $130_1$-$130_4$ formed on a first side panel member 315 and a second side panel member 317. The plurality of snap locks $130_1$-$130_4$ may be positioned proximate to the corner areas 318 of the front panel 120, as represented by dashed lines. Additionally, a lower panel member 300 of the front panel 120 includes one or more stabilizers 310 (referred to as "lugs"), which extend from a bottom edge 305 of the lower panel member 300 as shown in FIG. 3C. The lugs 310 are provided to prevent or limit forward-backward movement of the tray storage rack 100 due to unexpected forces being applied thereto after placement on a shelving unit 600 as shown in FIGS. 6A-6B. The opening 122 of the front panel 120 is sized for a tray to pass therethrough for placement on support members of the tray storage rack 100.

Figure 3B:
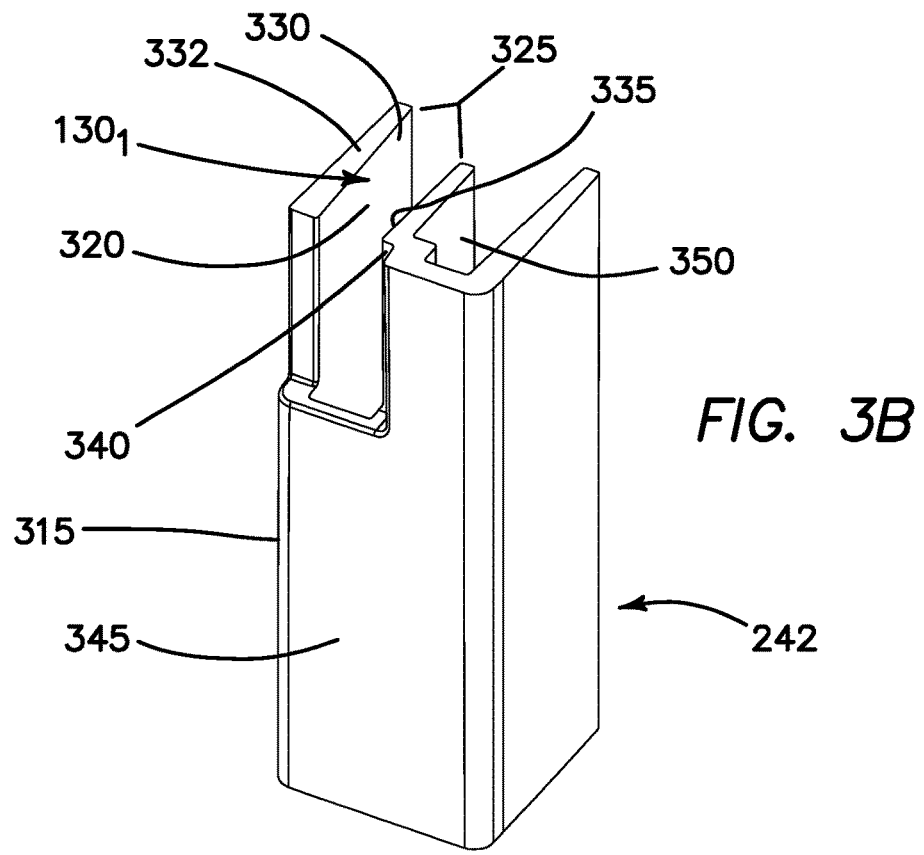
FIG. 3B is a detailed, perspective view of a snap lock of the front panel of FIG. 3A.
Figure 3D:
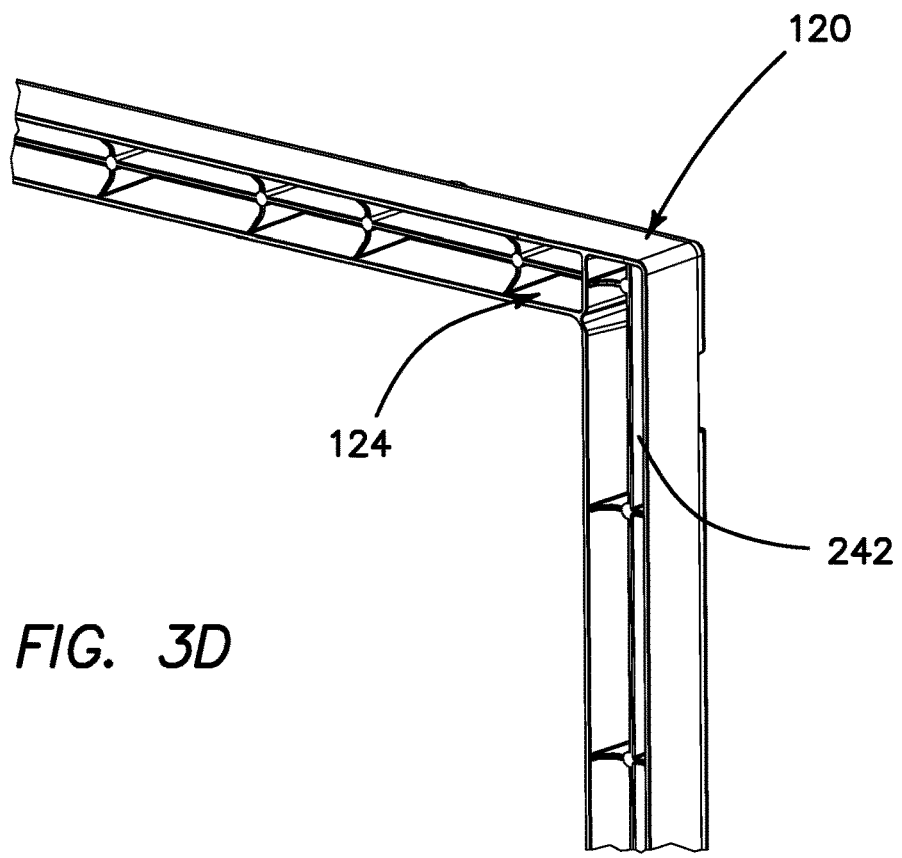
FIG. 3D is a rear perspective view of the front panel of the tray storage rack of FIG. 3A.
Figure 3C:
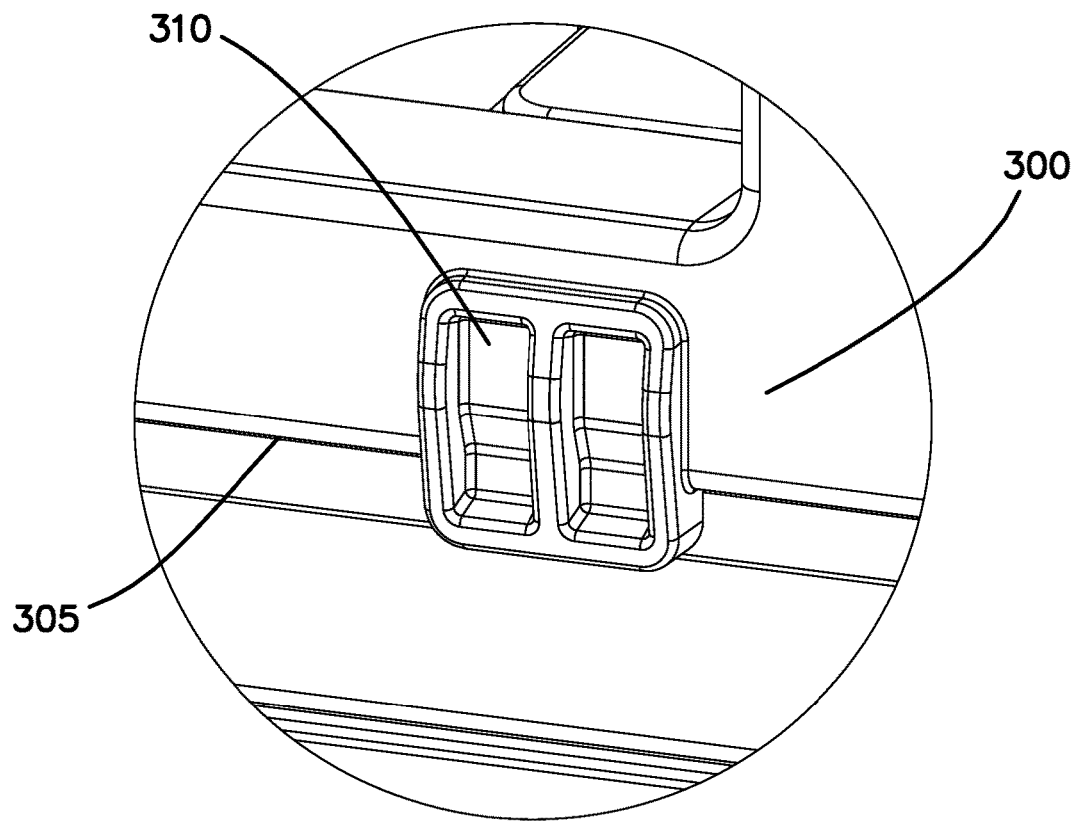
FIG. 3C is a detailed, perspective view of a stabilizer (lug) formed in the front panel of FIG. 3A.

Referring to FIG. 3B, an illustrative embodiment of the snap lock $130_1$ is shown. Herein, the snap lock $130_1$ includes an aperture 320 corresponding to a portion of a channel 325 formed in the front panel 120. The aperture 320 is sized to receive the locking edge connector 212 that is accessible via a backside 242 of the front panel 120. As shown, a side panel member 315 of the front panel 120 features a U-shaped cross-section, with an inner surface 330 of the side panel member 315 and an inner surface 335 of an intermediary rail 350 produce the channel 325. The intermediary rail 335 includes a recess 340 positioned at an intersection between the rail 335 and a top surface 345 of the front panel 120.

According one embodiment, the channel 325 features a prescribed width that is slightly greater (e.g., less than 0.05 inches greater) than a width of the locking edge connector 212 (e.g., maximum width of the elongated tab 282 and spacer 286) of FIG. 2B. However, in another embodiment, as shown in FIG. 2F, the prescribed width of the channel 325 does not need to be coordinated with the locking edge connector 212 implemented without the spacer 286.

Referring now to FIGS. 4A-4B, illustrative embodiments of the attachment operations of the locking edge connector 212 of the first rail assembly $110_1$ and the snap lock $130_1$ of the front panel 120 is shown. Herein, the locking edge connector 212 of the first rail assembly $110_1$ is formed to include the first protrusion 280, including the elongated tab 282 and the tapered end portion 284, and an optional spacer (not shown) coupled to an outer wall 400 of the elongated tab 282. For this embodiment of the disclosure, the first protrusion 280 is prepared for insertion into the aperture 320 corresponding to a portion of the channel 325 formed by the inner surface 330 of the side panel member 315 and the inner surface 335 of the intermediary rail 350.

Upon insertion of the first protrusion 280 of the locking edge connector 212 into the aperture 320, the tapered end portion 284 is situated to traverse across the inner surface 335 of the intermediary rail 350, and upon clearing a front end 420 of the inner surface 335, the elongated tab 282 moves in a further inward, lateral direction, given the bias of the elongated tab 282 of the locking edge connector 212, to reside within the recess 340. Stated differently, the recess 340 is sized to receive the tapered end portion 284 positioned at the end of elongated tab 282 forming the first protrusion 280 of the locking edge connector 212. When the tapered end portion 284 is retained in the recess 340, the locking edge connector 212 cannot be removed from the snap lock $130_1$ by simply moving the first rail assembly $110_1$ or the front panel 120 in a longitudinal direction. Rather, an outward, lateral force needs to be applied to the tapered end portion 284 for its removal from the recess 340. Concurrent with such operations, the first rail assembly $110_1$ or the front panel 120 may be moved in a longitudinal direction to disengage the first rail assembly $110_1$ from the front panel 120.

As shown in FIG. 4B, the spacer 286 is coupled to the outer wall 400 of the elongated tab 282 opposite to the tapered end portion 284. The spacer 286 may be formed as part of the first protrusion 280 and extending laterally from the elongated tab 282 to substantially occupy a remaining area within the aperture 320. By occupying area within the aperture 320, the spacer 286 enables the locking edge connector 212 to snugly fit within the aperture 320 and provide a more secure coupling between the first railing assembly $110_1$ and the front panel 120.

Referring to FIG. 5A, an illustrated embodiment of a first collapsible tray storage rack 100 and a second collapsible tray storage rack 500 is shown. The second collapsible tray storage rack 500 is construed in the same manner as described above for the first collapsible tray storage rack 100, which is illustrated with the first rail assembly $110_1$ including support members $116_1$-$116_N$ (e.g., N≥2; N=6) and the second rail assembly $110_2$ including support members $116_{N+1}$-$116_{2N}$. As further shown, the first collapsible tray storage rack 100 is positioned laterally adjacent to the second collapsible tray storage rack 500 so that the first rail assembly $110_1$ of the first collapsible tray storage rack 100 is positioned adjacent to a second rail assembly $510_2$ of the second collapsible tray storage rack 500. Furthermore, the notch 245 positioned on the upper member 117 of the first collapsible tray storage rack 100 is substantially aligned with a notch 545, which is positioned on an upper member 517 of the second collapsible tray storage rack 500. This orientation provides tray storage by neighboring collapsible tray storage racks 100 and 500.

Referring still to FIG. 5A, a securing mechanism 550 is attached to the notches 245 and 545 to couple the first collapsible tray storage rack 100 to the second collapsible tray storage rack 500. Stated differently, the securing mechanism 550 is configured to mitigate lateral movement by both the first collapsible tray storage rack 100 and the second collapsible tray storage rack 500.

Figure 5B:
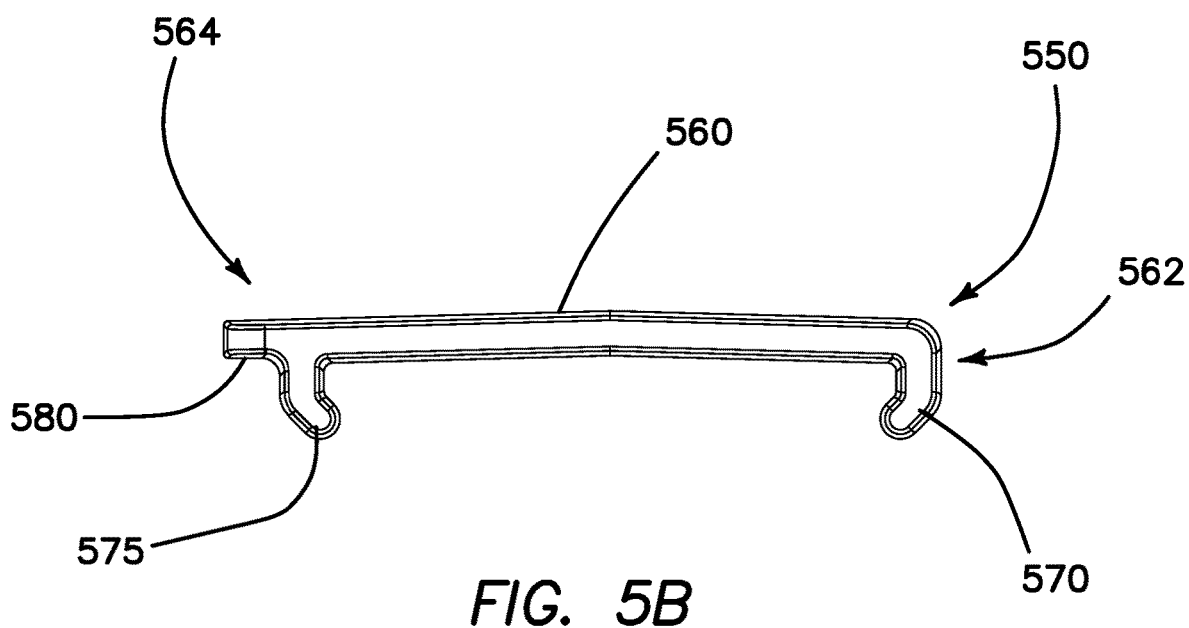
FIG. 5B is an embodiment of the securing mechanism of FIG. 5A.
Figure 5A:
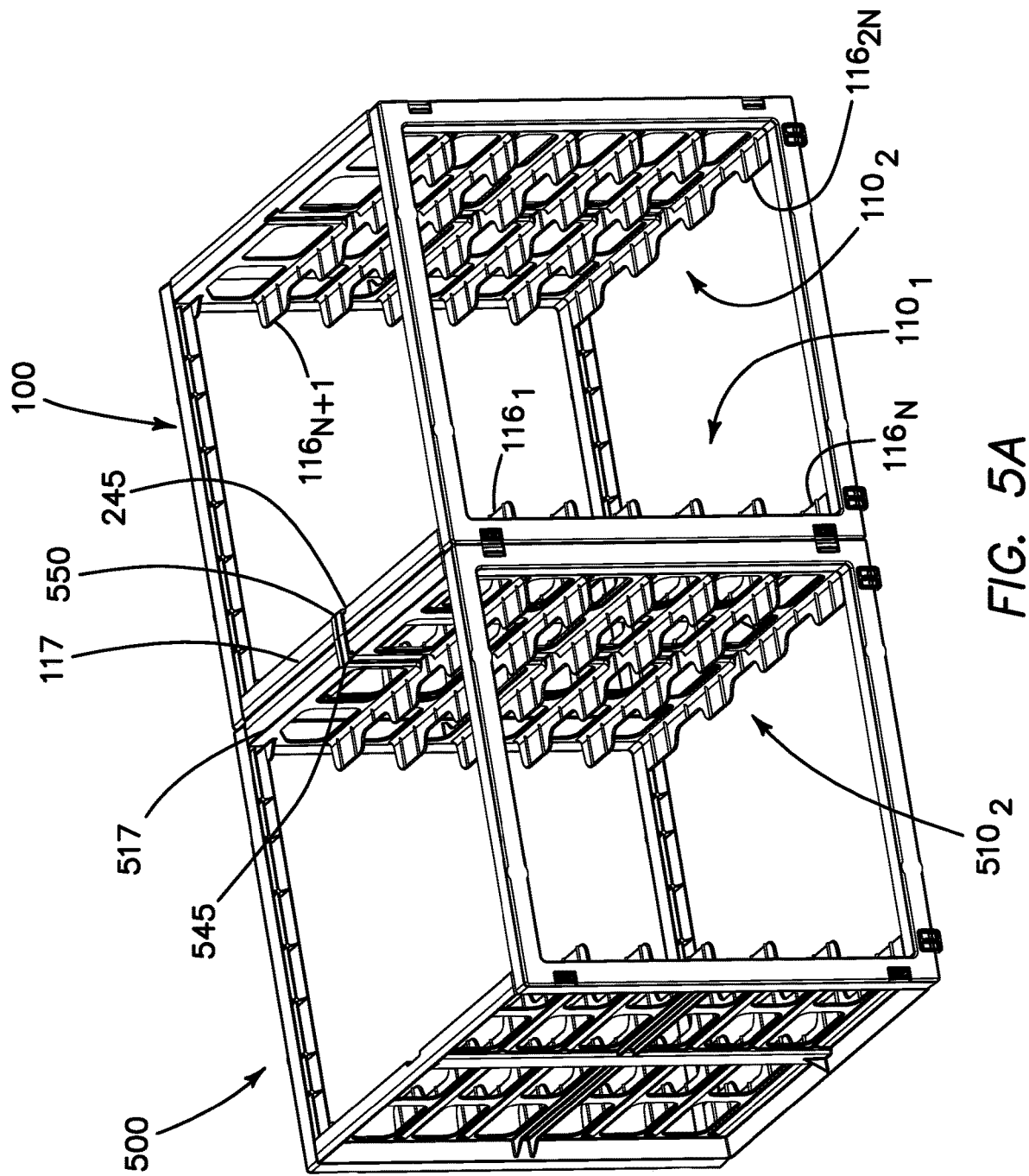
FIG. 5A is an illustrated embodiment of a first collapsible tray storage rack and a second collapsible tray storage rack connected through a securing mechanism operating as a fastener.

According to one embodiment of the disclosure, as shown in FIG. 5B, the securing mechanism 550 includes a base 560 with a first retention arm 570 formed by a first end 562 of the base 560 and a second retention arm 575 formed at or near a second end 564 of the base 560. The retention arms 570 and 575 are sized and angularly arranged for insertion into the notches 245 and 545 and retention thereto as shown in FIG. 5A. For this embodiment, the second end 564 of the base 560 is configured as an overhanging portion 580 extending from the retention arm 575. This overhanging portion 580 allows for easier removal of the securing mechanism 550 initially from the notch 545 upon lifting the base 560 at the overhanging portion 580.

Referring now to FIG. 6A, a front view of an illustrative embodiment of the first collapsible tray storage rack 100 and the second collapsible tray storage rack 500 being maintained on a shelf 610 of a shelving unit 600 is shown. Herein, trays 620 are placed on and maintained by the support members $116_1$-$116_{12}$ deployed within the first collapsible tray storage rack 100 as shown in FIG. 5A.

Referring still to FIG. 6A, for each collapsible tray storage rack (e.g., the first collapsible tray storage rack 100), one or more stabilizers 310 (referred to as "lugs") downwardly extend from the bottom edge 305 of the lower panel member 300 of the front panel 120. Hence a portion of the lugs 310 will be positioned to be flushed or extend below a first (upper) edge 630 of the shelf 610. Hence, the lugs 310 prevent forward, longitudinal movement of the first collapsible tray storage rack 100 when positioned on the shelf 610.

Similarly, as illustrated in FIG. 6B, a rear review of the first collapsible tray storage rack 100 and the second collapsible tray storage rack 500 positioned on the shelf 610 of the shelving unit 600 is shown. The trays 620 are placed on and maintained by the support members $116_1$-$116_{2N}$ deployed within the first collapsible tray storage rack 100 while the second collapsible tray storage rack 500 is empty exposing the support members $516_1$-$516_{2N}$. Again, for each collapsible tray storage rack (e.g., the first collapsible tray storage rack 100), one or more lugs 310 downwardly extend from a bottom edge 640 of a lower member 645 of the rear panel 150. Hence, a portion of the lugs 310 will be positioned to be flushed with or extend at least below a second (upper) edge 650 of the shelf 610. The second edge 650 of the shelf 610 is opposite the first edge 630. Hence, the lugs 310 prevent backward, longitudinal movement of the first collapsible tray storage rack 100 when positioned on the shelf 610.

Referring back FIG. 6A, as described above, the lugs 310 may be used to mitigate longitudinal movement of the first collapsible tray storage rack 100 when placed on the shelving unit 600, and the securing mechanism 550 of FIGS. 5A-5B may be used to mitigate lateral movement of the first collapsible tray storage rack 100. Additionally, a rack fastener 660 may be used to secure the first collapsible tray storage rack 100 to the shelving unit 600. For this embodiment, the rack fastener 660 couples the first collapsible tray storage rack 100 to a post 670 of the shelving unit 610.

Each of the posts 670 is comprised of plastic or plastic composites and is fabricated by the known process of pultrusion. Briefly, the process of pultrusion includes a plurality of strands of fiberglass or other suitable material being extruded from a plurality of rovings. The strands are brought together with other materials such as mats and are placed in a resin bath or are otherwise impregnated with resin and other substances that bind the roving strands together. The resin infused strands are then mechanically pulled through a forming die which forms the fiberglass to a predetermined shape. After being pulled, heated, or cured, the pultruded posts are cut to a desired length.

Figure 7A:
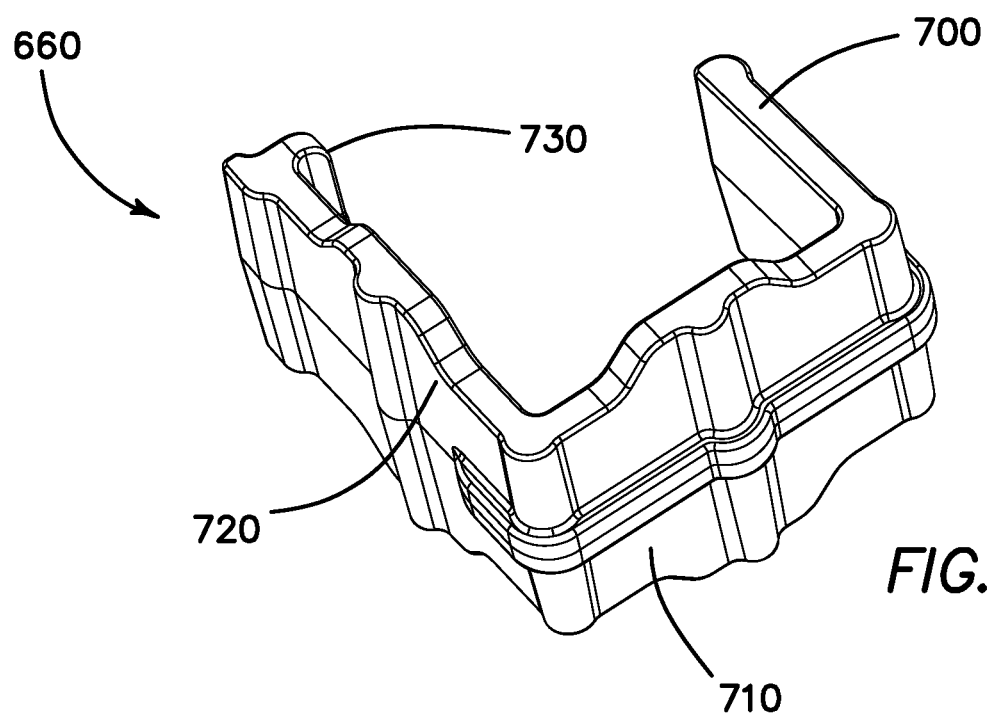
FIG. 7A is an embodiment of a rack fastener for securing a collapsible tray storage rack to the shelving unit of FIGS. 6A-6B.
Figure 7B:
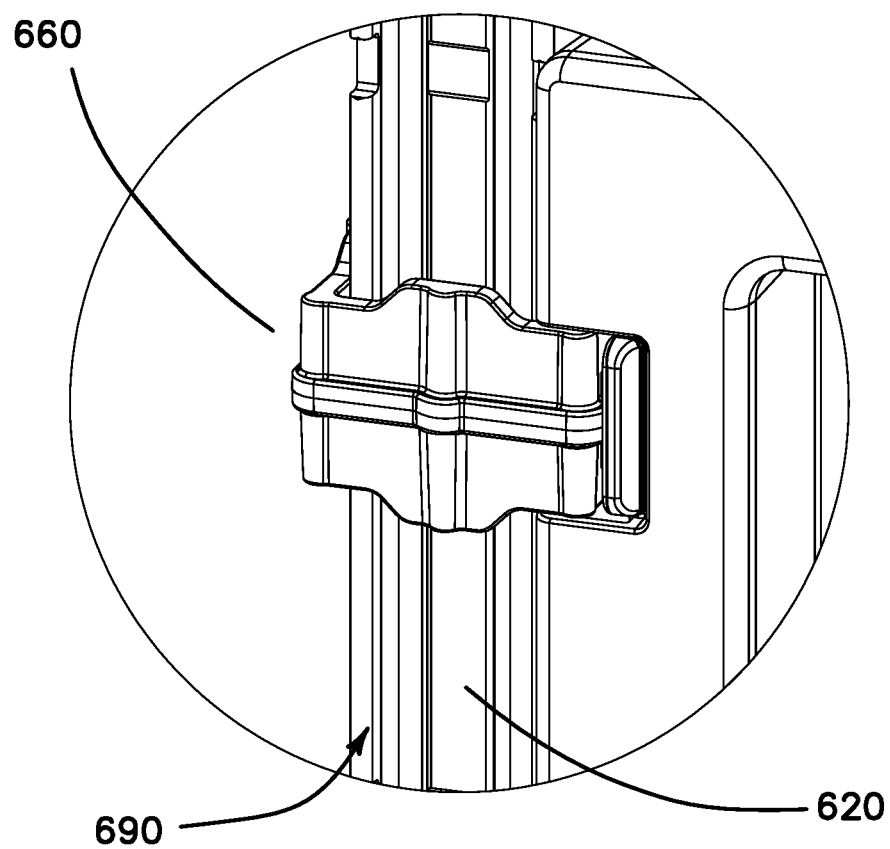
FIG. 7B is an embodiment of the rack fastener of FIG. 7A securing the collapsible tray storage rack to the shelving unit of FIGS. 6A-6B.

More specifically, as shown in FIGS. 7A-7B, the rack fastener 660 is configured as a U-shaped fastener including a first segment 700, a second segment 710, and a third segment 720 that is sized to extend an entire width of the post 670. According to this embodiment of the rack fastener 660, as shown in FIG. 7A, the first segment 700 is oriented to be substantially in parallel with the third segment 720 and substantially perpendicular to the second segment 710. The third segment 720 includes a flange 730, where the flange 730 is oriented substantially in parallel with the second segment 710.

As a result, when the rack fastener 660 is attached to the post 670 as shown in FIGS. 6B and 7B, the flange 730 is positioned adjacent to a first side 680 of the post 670, which is opposite from a second side 690 of the post 670. Also, the second segment 710 is positioned adjacent to the second side 690 of the post 670, but extends beyond the length of the second side 690 to permit insertion of the first segment 700 into the aperture of the snap lock $130_1$ of the front panel 120. Using the rack fastener 660, the first collapsible tray storage rack 100 is coupled to the shelving unit 600 and lateral and/or longitudinal movement of the rack 100 is mitigated. Additionally or in the alternative, the rack fastener 660 may be used to attach the first collapsible tray storage rack 100 to another post via the rear panel 150. The first segment 700 of the rack fastener 660 may be inserted into apertures formed within the snap locks $130_3$ or $130_4$ within the rear panel 150.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A tray storage rack comprising:
   a front panel partially formed by a plurality of side panel members including a first side panel member and a second side panel member, each of the plurality of side panel members associated with the front panel includes one or more attachment mechanisms;
   a rear panel partially formed by a plurality of side panel members including a third side panel member and a fourth side panel member, each of the plurality of side panel members associated with the rear panel includes one or more attachment mechanisms; and
   a plurality of rail assemblies including
     a first rail assembly that comprises (i) a first frame, (ii) a first plurality of support members extending laterally from the first frame, (iii) a first set of edge connectors extending in a first longitudinal direction from the first frame, and (iv) a second set of edge connectors extending in a second longitudinal direction being a direction opposite from the first longitudinal direction, wherein the first frame, the first plurality of support members, the first set of edge connectors and the second set of edge connectors are fabricated as a singular component;
     a second rail assembly that comprises (i) a second frame, (ii) a second plurality of support members extending laterally from the second frame and aligning with the first plurality of support members to form a plurality of support member pairs so that each support member pair is oriented to support a tray, (iii) a third set of edge connectors extending in the first longitudinal direction from the second frame, and (iv) a fourth set of edge connectors extending in the second longitudinal direction from the second frame, wherein the second frame, the second plurality of support members, the third set of edge connectors and the fourth set of edge connectors are fabricated as a singular component, wherein the plurality of rail assemblies are configured to be attached to the front panel by coupling of the first set of edge connectors and the third set of edge connectors to the front panel and are attached to the rear panel by coupling of the second set of edge connectors and the fourth set of edge connectors to the rear panel, and wherein the first set of edge connectors includes one or more locking edge connectors, each of the one or more locking edge connectors includes a protrusion for insertion through an aperture within a first attachment mechanism of the one or more attachment mechanisms of the front panel and retention of the protrusion by the first attachment mechanism.

2. The tray storage rack of claim 1, wherein the first rail assembly and the second rail assembly are formed by injection molding.

3. The tray storage rack of claim 1, wherein the first attachment mechanism includes a snap lock that is formed by a first rail partially forming an outer side surface of the front panel, a second rail positioned to form an aperture between the first rail and the second rail, and a recess formed between an edge of the second rail and a top surface of the front panel extending from the edge of the second rail.

4. The tray storage rack of claim 3, wherein the protrusion includes an elongated tab inserted into the aperture of the first attachment mechanism and a tapered end portion that is received by the recess upon insertion of the protrusion into the aperture of the snap lock for a prescribed distance.

5. The tray storage rack of claim 4, wherein the elongated tab is laterally biased to engage with the recess upon the tapered end portion clearing the edge of the second rail.

6. The tray storage rack of claim 3, wherein the first set of edge connectors further comprises one or more retention edge connections to (i) occupy a channel being an area formed between the first rail and the second rail and (ii) partially affix the first rail assembly of the front panel.

7. The tray storage rack of claim 1, wherein the front panel includes one or more stabilizers positioned on a front surface of the front panel and extend below a bottom edge of a lower panel member of the front panel, the lower panel member is interposed between the first side panel member and the second side panel member partially forming the front panel.

8. The tray storage rack of claim 1 being positioned on a shelf of a shelving unit supported by a plurality of posts formed by pultrusion and the bottom edge of one or more stabilizers covering at least a portion of an edge of the shelf.

9. The tray storage rack of claim 1, wherein the frame of the first rail assembly comprises an upper member including a notch sized to receive and retain a first end of a fastener and a second end of the fastener being coupled to an upper member of a second tray storage rack neighboring the tray storage rack.

10. The tray storage rack of claim 8, wherein the first rail assembly comprises a first post attachment member including a first fastening portion sized for insertion and retention in an aperture formed as part of the first attachment mechanism and a second post attachment member including a second fastening portion sized for insertion and retention in a channel etched into a first post of the plurality of posts.

11. An apparatus comprising:
a plurality of panels including
a front panel formed by a first plurality of panel members, at least two panel members of the first plurality of panel members being integrated within one or more attachment mechanisms, and
a rear panel formed by a second plurality of panel members, at least two panel members of the second plurality of panel members being integrated within one or more attachment mechanisms; and
a plurality of rail assemblies removably coupled to the at least two panel members of the first plurality of panel members and the at least two panel members of the second plurality of panel members, the plurality of rail assemblies including
a first rail assembly fabricated as a singular injection-molded component, the first rail assembly comprises (i) a first plurality of support members extending in a first lateral direction, (ii) a first set of edge connectors extending in a first longitudinal direction, and (iii) a second set of edge connectors extending in a second longitudinal direction being a direction opposite from the first longitudinal direction, and
a second rail assembly fabricated as a singular injection-molded component, the second rail assembly comprises (i) a second plurality of support members extending in a second lateral direction in a direction opposite from the first lateral direction and aligning with the first plurality of support members to form a plurality of support member pairs so that each support member pair of the plurality of support member pairs from the first plurality of support members and the second plurality of support members is oriented to support a tray, (ii) a third set of edge connectors extending in the first longitudinal direction, and (iv) a fourth set of edge connectors extending in the second longitudinal direction,
wherein the plurality of rail assemblies, front panel and rear panel, when coupled together, form a tray storage rack configured to support trays by corresponding pairs of support members and each corresponding pair of support members includes a support member of the first plurality of support members and a support member of the second plurality of support members, and
wherein the first set of edge connectors includes one or more locking edge connectors, each of the one or more locking edge connectors includes a protrusion for insertion through an aperture within an attachment mechanism of the one or more attachment mechanisms of the front panel and retention of the protrusion by the attachment mechanism.

12. The apparatus of claim 11, wherein the attachment mechanism of the one or more attachment mechanisms includes a snap lock that is formed by a first rail partially forming an outer side surface of the front panel, a second rail positioned to form an aperture between the first rail and the second rail, and a recess formed between an edge of the second rail and a top surface of the front panel extending from the edge of the second rail.

13. The apparatus of claim 12, wherein the protrusion includes an elongated tab inserted into the aperture of the attachment mechanism and a tapered end portion that is received by the recess upon insertion of the protrusion into the aperture of the snap lock for a prescribed distance, the elongated tab is laterally biased to engage with the recess upon the tapered end portion clearing the edge of the second rail.

14. The apparatus of claim 12, wherein the first set of edge connectors further comprises one or more retention edge connections to (i) occupy a channel being an area formed between the first rail and the second rail and (ii) partially affix the first rail assembly of the front panel.

15. The apparatus of claim 11, wherein the front panel includes one or more stabilizers that extend below a bottom edge of a lower panel member of the front panel, the lower panel member is interposed between a first side panel member and a second side panel member partially forming the front panel.

16. The apparatus of claim 11 being positioned on a shelf of a shelving unit supported by a plurality of posts formed by pultrusion and the bottom edge of one or more stabilizers covering at least a portion of an edge of the shelf.

17. The apparatus of claim 16, wherein the first rail assembly comprises a first post attachment member including a first fastening portion sized for insertion and retention in an aperture formed as part of the attachment mechanism of the one or more attachment mechanisms and a second post attachment member including a second fastening portion sized for insertion and retention in a channel etched into a first post of the plurality of posts.

18. A tray storage rack comprising:
a front panel including at least a first attachment mechanism formed as part of a first panel member and a second attachment mechanism formed as part of a second panel member;
a rear panel including at least a third attachment mechanism formed as part of a third panel member and a fourth attachment mechanism formed as part of a fourth panel member;
a first rail assembly fabricated as a singular injection-molded component, the first rail assembly including (i) a first plurality of support members extending in a first lateral direction, (ii) a first set of edge connectors extending in a first longitudinal direction for coupling with the first attachment mechanism, and (iii) a second set of edge connectors extending in a second longitudinal direction for coupling with the third attachment mechanism, the first longitudinal direction being a direction opposite from the second longitudinal direction; and
a second rail assembly fabricated as a singular injection-molded component, the second rail assembly including (i) a second plurality of support members extending in a second lateral direction opposite the first lateral direction, (ii) a third set of edge connectors extending in the first longitudinal direction for coupling with the second attachment mechanism, and (iii) a fourth set of edge connectors extending in the second longitudinal direction for coupling with the fourth attachment mechanism,
wherein the first set of edge connectors includes one or more locking edge connectors, each of the one or more locking edge connectors includes a protrusion for insertion through an aperture within the first attachment mechanism of the front panel and retention of the protrusion by the first attachment mechanism.

19. A shelving unit, comprising:
a plurality of posts oriented vertically;
a plurality of shelves each attached to the plurality of posts; and
a tray storage rack positioned on a first shelf of the plurality of shelves, the tray storage rack comprises
a front panel including at least a first attachment mechanism formed as part of a first panel member of the front panel and a second attachment mechanism formed as part of a second panel member of the front panel,
a rear panel including at least a third attachment mechanism formed as part of a third panel member of the rear panel and a fourth attachment mechanism formed as part of a fourth panel member of the rear panel,
a plurality of rail assemblies coupled to the front panel and the rear panel, each rail assembly of the plurality of rail assemblies includes (i) a plurality of support members extending in a lateral direction, (ii) a first set of edge connectors extending in a first longitudinal direction for coupling with one of the first attachment mechanism and the second attachment mechanism, and (iii) a second set of edge connectors extending in a second longitudinal direction for coupling with one of the third attachment mechanism and the fourth attachment mechanism, the first longitudinal direction being a direction opposite from the second longitudinal direction, and
one or more stabilizers positioned on a front surface of the front panel oriented in a first direction and extending below a bottom edge of a lower panel member of the front panel and positioned in front of an edge of the first shelf.

20. The shelving unit of claim 19 further comprising:
a rack fastener to secure the tray storage rack to a first post of the plurality of posts, the rack fastener includes a first segment sized for insertion and retention in an aperture accessible from a front surface of the first panel member formed as part of the first attachment mechanism, a second segment extending over a first surface of the first port facing a first direction being a direction of orientation of the front panel and a third segment extending along a second surface of the first post in a second direction orthogonal to the first direction.

21. The shelving unit of claim 19, wherein the first set of edge connectors includes one or more snap locks that is formed by a first rail partially forming an outer side surface of the front panel, a second rail positioned to form the aperture between the first rail and the second rail, and a recess formed between an edge of the second rail and a top surface of the front panel extending from the edge of the second rail.

22. The shelving unit of claim 21, wherein the first set of edge connectors further include a protrusion including an elongated tab inserted into an aperture of one of the first and second attachment mechanisms and a tapered end portion that is received by the recess upon insertion of the protrusion into the aperture of the snap lock.

23. The shelving unit of claim 22, wherein the elongated tab is laterally biased to engage with the recess upon the tapered end portion clearing the edge of the second rail.

24. The shelving unit of claim 21, wherein the first set of edge connectors further comprises one or more retention edge connections to (i) occupy a channel being an area formed between the first rail and the second rail and (ii) partially affix the first rail assembly of the front panel.

* * * * *